United States Patent
Jónsson et al.

(10) Patent No.: US 11,451,601 B2
(45) Date of Patent: Sep. 20, 2022

(54) SYSTEMS AND METHODS FOR DYNAMIC ALLOCATION OF COMPUTING RESOURCES FOR MICROSERVICE ARCHITECTURE TYPE APPLICATIONS

(71) Applicant: Spotify AB, Stockholm (SE)

(72) Inventors: Arnthór Johann Jónsson, Solna (SE); Emil B. L. Pedersen, Stockholm (SE)

(73) Assignee: Spotify AB, Stockholm (SE)

(*) Notice: Subject to any disclaimer, the term of this patent is extended or adjusted under 35 U.S.C. 154(b) by 122 days.

(21) Appl. No.: 16/995,927

(22) Filed: Aug. 18, 2020

(65) Prior Publication Data
US 2022/0060526 A1  Feb. 24, 2022

(51) Int. Cl.
*H04L 65/61* (2022.01)
*G06F 9/50* (2006.01)
*H04L 67/06* (2022.01)

(52) U.S. Cl.
CPC ............ *H04L 65/61* (2022.05); *G06F 9/5027* (2013.01); *H04L 67/06* (2013.01); *G06F 2209/5013* (2013.01)

(58) Field of Classification Search
CPC ..... H04L 65/4069; H04L 67/06; H04L 65/61; G06F 9/5027; G06F 2209/5013
See application file for complete search history.

(56) References Cited

U.S. PATENT DOCUMENTS

| | | | |
|---|---|---|---|
| 7,613,768 B2 * | 11/2009 | Harville | H04L 29/06027 707/999.01 |
| 10,691,514 B2 * | 6/2020 | McClory | G06F 9/5027 |
| 2006/0256130 A1 * | 11/2006 | Gonzalez | G06F 16/958 707/E17.116 |
| 2013/0086273 A1 | 4/2013 | Wray et al. | |
| 2014/0094159 A1 * | 4/2014 | Raleigh | H04W 24/02 455/418 |
| 2014/0344391 A1 * | 11/2014 | Varney | H04L 65/4084 709/213 |
| 2016/0006673 A1 * | 1/2016 | Thomas | G06F 3/0619 709/226 |
| 2018/0077138 A1 * | 3/2018 | Bansal | G06F 9/4881 |
| 2018/0109634 A1 | 4/2018 | Lawson et al. | |
| 2018/0324204 A1 * | 11/2018 | McClory | G06F 11/3684 |
| 2018/0343480 A1 | 11/2018 | Li et al. | |
| 2020/0019841 A1 | 1/2020 | Shaabana et al. | |
| 2021/0081818 A1 * | 3/2021 | Fahmy | G06N 20/00 |

OTHER PUBLICATIONS

Li et al., "Elastic edge cloud resource management based on horizontal and vertical scaling", The Journal of Supercomputing (Feb. 11, 2020).

* cited by examiner

*Primary Examiner* — Kristie D Shingles
(74) *Attorney, Agent, or Firm* — Merchant & Gould P.C.

(57) ABSTRACT

Systems and methods for auto-scaling computing resources for applications that rely on microservices, such as media streaming applications. In example embodiments, the systems and methods use a hybrid approach that takes into account proactive and reactive metrics to predict future processing needs. The proactive metrics use data obtained from the microservices pipeline. In example embodiments, computing units are deployed or removed from a cluster of computing units in anticipation of a future computational need and in consideration of quality of service requirements.

33 Claims, 7 Drawing Sheets

SYSTEMS AND METHODS FOR DYNAMIC ALLOCATION OF COMPUTING RESOURCES FOR MICROSERVICE ARCHITECTURE TYPE APPLICATIONS

TECHNICAL FIELD

Example aspects described herein generally relate to optimization of computing resources, and more particularly to dynamic adjustment of available computing resources for computationally intensive applications performed by cloud-based type computing platforms.

BACKGROUND

In recent years, the popularity of cloud computing has increased. Cloud computing refers to computing by computing resources, e.g., processors and memory, that are managed by a management entity that is external to the consumer (or subscriber) entities that tap the computing resources for their computational needs. The consumer entities are independent of one another and it is the responsibility of the management entity to allocate the cloud's computing resources as efficiently as possible to meet the consumption demands of the consumer entities while minimizing costs. Cloud computing has transformed businesses and enhanced productivity by provisioning computing resources such as processing and storage on a "pay-as-you-go" model.

In cloud computing, there is a tradeoff between minimizing financial cost and meeting Quality-of-Service (QoS) requirements. Finding an optimal tradeoff between financial cost and QoS can be a challenge, exacerbated by the presence of service level agreements (SLAs) that specify QoS targets. For this reason, the cloud application may suffer problems stemming from under or over-provisioning of cloud computing resources. It can be challenging to find an optimal capacity for an application under the conditions of a dynamically varying workload.

Auto-scaling is an orchestration method that dynamically adjusts computing resources in the system. The goal of an auto-scaling system is to ensure that the system has the required number of resources needed to handle varying external demands. Resources are released in a timely manner when the workload in the system is low and resources are added when workload increases, thus maintaining a QoS for various types of workloads.

Existing auto-scaling methods include vertical scaling and horizontal scaling. Vertical scaling involves adding or removing physical resources in a given server, e.g., by increasing the number of allocated computer processing units or the amount of memory. Horizontal scaling involves adding or removing server replicas of the application in the cluster. Unlike vertical scaling, this can be done using multiple servers and is therefore not limited by the physical resources of a single server.

Generally speaking, there are two types of auto-scaling methodologies, including reactive methodologies and proactive methodologies.

Existing reactive methodologies use static thresholds to react to the current state of the system, using the latest monitored values such as processor(s) and memory utilization. While reactive auto-scaling can be useful when handling different workloads in the system, it has drawbacks. For example, determining that a system needs scaling can occur only after a target metric is above or below the threshold. During the time it takes to both detect the need for resources and for resources to become active, the system can be performing outside of its optimal resource consumption.

Proactive methodologies make early decisions about scaling actions by anticipating future demands, provisioning resources for when they are needed. Using forecasting algorithms to predict future workload can work well for services with clear patterns in handled workload, e.g., services with consistently higher or lower workloads at certain times of day or year, or on certain days of the week. However, for services with unpredictable workloads, making consistently accurate predictions of future demand is difficult and unreliable. Predicting random workload or an unexpected workload burst is difficult, with one of the challenges being how to select the most suitable algorithm for the system. The data that is used might also present unexpected changes or noise, and the system may not be capable of adapting to those changes promptly and filtering out noise accurately to avoid scaling actions that lead to a waste in resources or QoS violations.

It would also be desirable, therefore, to provide improved orchestration and allocation of computing resources for cloud-computing type platforms, and particularly for cloud-computing type platforms that handle computationally intensive applications that offer poor predictability of resource demand according to traditional methods.

SUMMARY

Aspects of the present disclosure relate to horizontal auto-scaling of computing resources, e.g., by dynamic adding or removing of server replicas of a given application in a computing cluster of a cloud computing platform.

Aspects of the present disclosure relate to proactive approaches to auto-scaling of computing resources for certain types of software applications.

Aspects of the present disclosure relate to hybrid proactive-reactive approaches to auto-scaling of computing resources for certain types of software applications. A hybrid proactive-reactive approach is an approach that uses both proactive and reactive methodologies.

Aspects of the present disclosure relate to proactive and hybrid proactive-reactive approaches to auto-scaling of an asynchronous computationally exceptive software application, such as an application that uses a publish-subscribe pattern.

Aspects of the present disclosure relate to auto-scaling of computing resources of microservice architecture type software applications performed by a cloud computing platform. In a microservice architecture, a software application is structured as a collection of small, well-defined microservices. Each microservice corresponds to an action performed by an application. The microservices communicate with each other only through well-defined application programming interfaces (APIs). Each functionality of the software application is its own dedicated microservice. A monolithic architecture has drawbacks particularly when the software application grows and the number of developers working on the application grows. Splitting up the application into more maintainable modules (or microservices) can improve efficiency by allowing each module to be worked on independently.

In a microservices architecture type software application, the application consists of a computing pipeline having a number of microservice functionalities or actions that are performed in sequence. In examples, the microservices can be grouped into different services. For example, for a media streaming application, some of the associated microservices can be grouped as an ingestion service and others can be grouped as a transcoding service. Publication requests for streaming media content items are first processed by the ingestion service and those that remain active at the end of the pipeline of microservices of the ingestion service are fed to the transcoding service, which itself can consist of a sequence of discrete microservices. In examples, each service uses a different cluster of computing resources hosted by the cloud computing platform.

Aspects of the present disclosure relate to using resource consumption data for application microservices performed at earlier stages of the pipeline as a metric to predict a computing workload at a later stage of the pipeline. In examples, resource consumption data for microservices of a first service of an application are used as a metric to predict computing workload for a later, second service of the application, the first and second services being handled by their own cluster of computing resources. Computing resources for the later service or the later stage of the pipeline can be allocated in advance of that later stage functionality occurring based on the earlier stage data.

According to aspects of the present disclosure, a method of scaling a number of computer processing units, comprises the steps of: monitoring, at each of a plurality of times that precede a predefined time, a plurality of previous events in each of a plurality of event sequences, each of the previous events having an associated action type that is different from an associated action type of at least one later action in each of the plurality of action sequences, to provide previous events data; selecting a number of computer processing units to perform the at least one later action at the predefined time, the selecting being based on the previous events data; and making available at the predefined time the selected number of computer processing units to perform the at least one later action.

According to further aspects of the present disclosure, a system for scaling a number of computer processing units, comprises: one or more processors and one or more storage devices storing instructions that are operable, when executed by the one or more processors, to cause the one or more processors to: monitor, at each of a plurality of times that precede a predefined time, a plurality of previous events in each of a plurality of event sequences, each of the previous events having an associated action type that is different from an associated action type of at least one later action in each of the plurality of action sequences, to provide previous events data; select a number of computer processing units to perform the at least one later action at the predefined time, the select being based on the previous events data; and make available at the predefined time the selected number of computer processing units to perform the at least one later action.

According to further aspects of the present disclosure, a non-transitory computer-readable medium has stored thereon one or more sequence of instructions for causing one or processors to perform: monitoring, at each of a plurality of times that precede a predefined time, a plurality of previous events in each of a plurality of event sequences, each of the previous events having an associated action type that is different from an associated action type of at least one later action in each of the plurality of action sequences, to provide previous events data; selecting a number of computer processing units to perform the at least one later action at the predefined time, the selecting being based on the previous events data; and making available at the predefined time the selected number of computer processing units to perform the at least one later action.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for auto-scaling computing resources for particular types of applications. Thus, features of the present disclosure reflect improvements in the functioning of computers themselves. This description is not intended to limit the application of the example embodiments presented herein. In fact, after reading the following description, it will be apparent to one skilled in the relevant art(s) how to implement the following example embodiments in alternative embodiments such as on other types of computing applications and computing environments.

In addition, not all of the components are required to practice the invention, and variations in the arrangement and type of the components may be made without departing from the spirit or scope of the invention.

As described herein, auto-scaling of computing resources, such as processing and storage resources, can be implemented by an auto-scaling system. The auto-scaling system can use various hardware and software components to perform its auto-scaling functions. The auto-scaling functions include, generally, determining whether to scale and, if it is determined to scale up or down, causing the cloud computing platform to allocate more or fewer computing resources accordingly.

Figure 1:
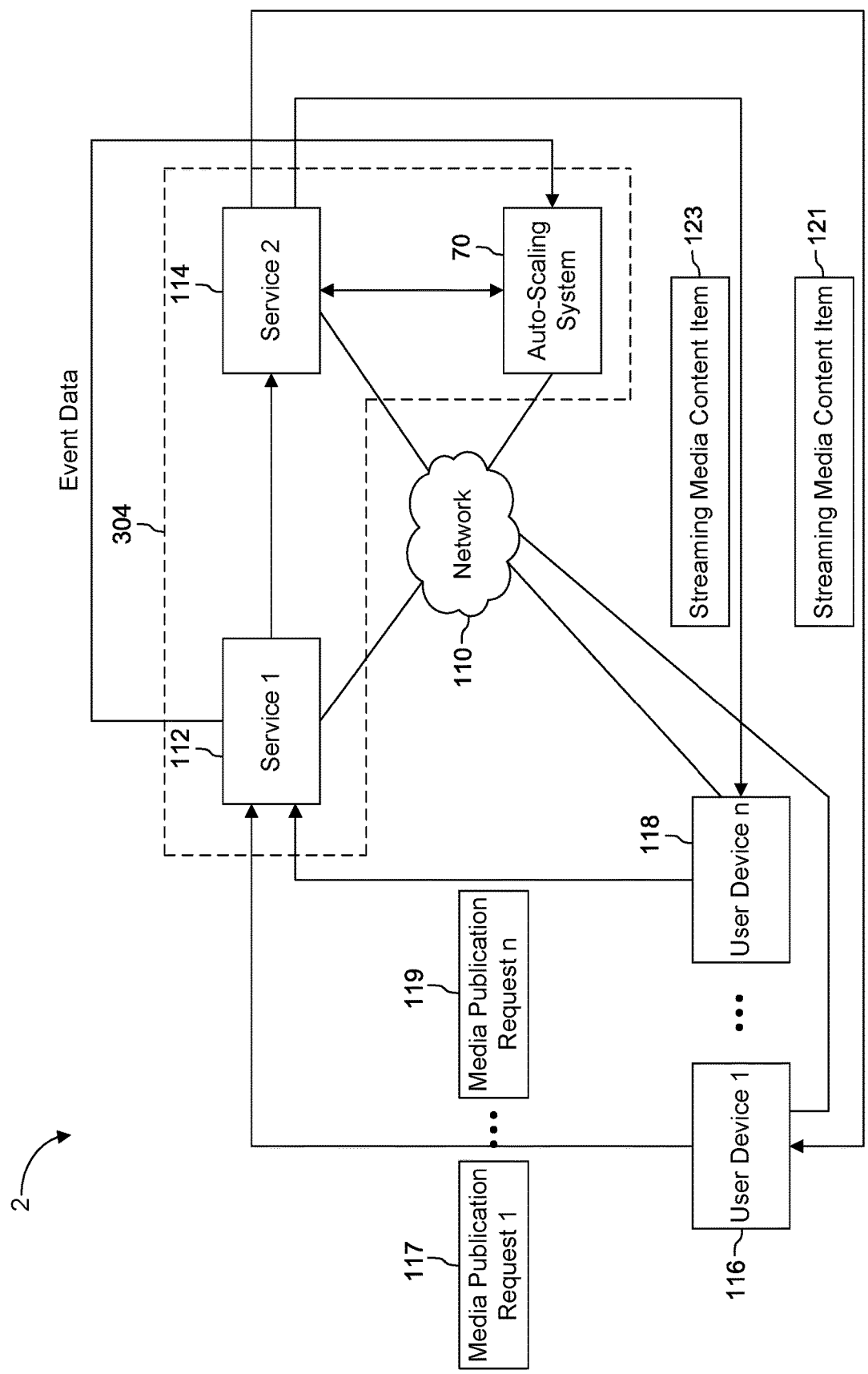
FIG. 1 schematically illustrates a system of computing devices that uses auto-scaling features in accordance with the present disclosure.

FIG. 1 schematically illustrates a system 2 of computing devices that uses auto-scaling features in accordance with the present disclosure. The system 2 includes a media delivery system 304. The media delivery system 304 includes one or more server computers that run media delivery services 112 and 114, described in more detail below.

The media delivery system 304 also includes an auto-scaling system 70 that interfaces with the services 112 and 114. The auto-scaling system 70 will be described in more detail below.

Components of the media delivery system 304 can interface with a plurality of user devices, such as user device 116 (user device 1) through user device 118 (user device n) via a network 110. The user devices 116 through 118 can serve as media playback devices. The user devices 116 through 118 are configured to output requests 117, 119 respectfully, to stream media content items. The requests are received and processed by the media delivery system 304 and the media delivery system 304 outputs the streaming media content items 121, 123 to the respective user device 116, 118 that requested them.

In example embodiments, the auto-scaling system 70 uses a multi-phase process loop, e.g., a four-phase process loop. The four phases consist of a monitoring phase, an analysis phase, a planning phase, and an execution phase. An example of such a processing loop 10 is schematically represented in FIG. 2.

Figure 2:
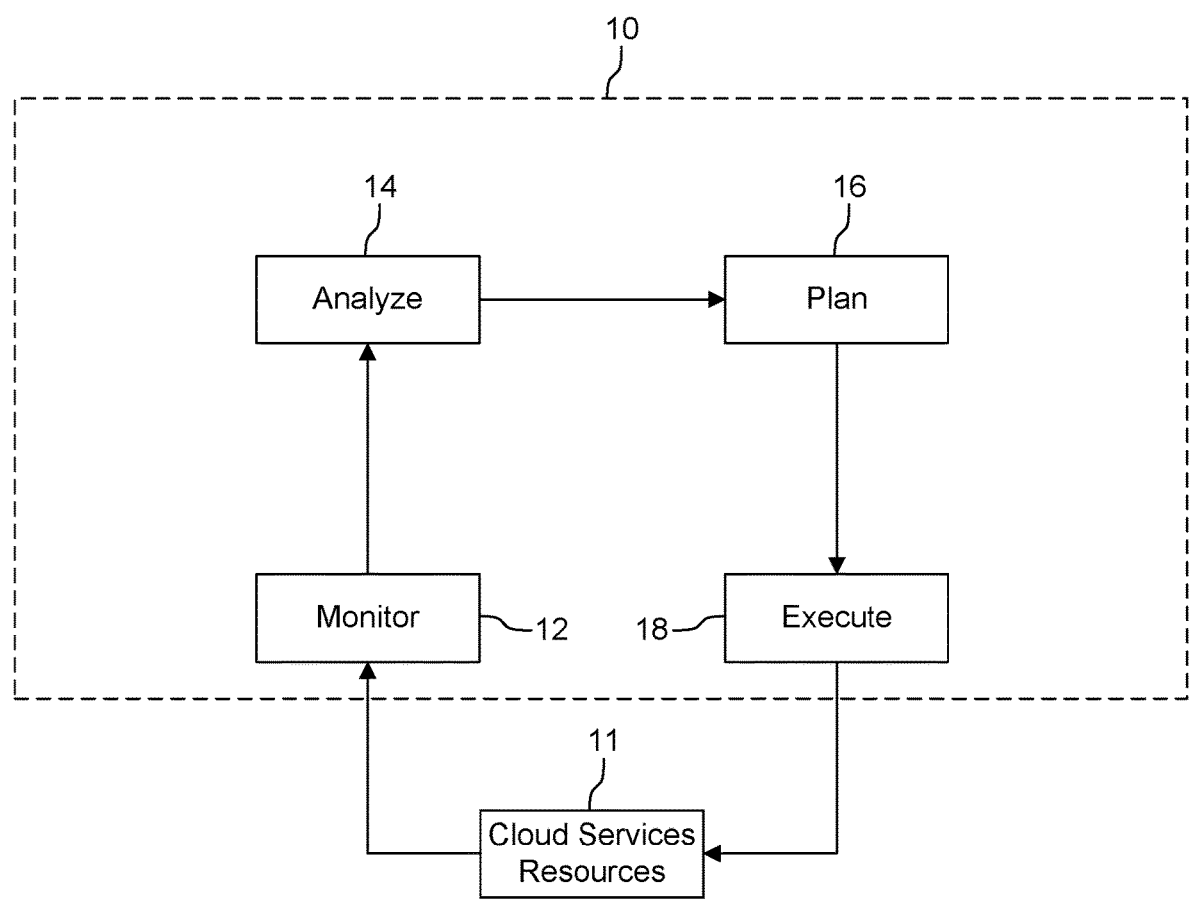
FIG. 2 schematically illustrates an example multi-phase processing loop that can be used to implement one or more features of the systems and methods of this disclosure.

Referring to FIG. 2, the monitoring phase 12 includes collecting performance metrics from use of the cloud services and resources 11 to be used to determine whether scaling is required. The metrics that can be used can be, e.g., computer processing unit usage, network traffic, memory usage, request rate, request size, request type, etc. As used herein, a "request" is an application trigger. For example, a request can be a request to publish a media content item or to stream a media content item, such as a podcast, with the request size being the size of the podcast. A request can also be the making available of a new or modified media content item to be transcoded. For example, initiation by a media content provider of a publication of a new or modified media content item can be an application trigger. In certain implementations, transcoding is automatically initiated on a preset periodic basis (e.g., every five minutes). At each transcoding initiation, the new or modified media content publication requests that have occurred since the previous initiation enter the transcoding pipeline. The request rate is the number of requests being ingested per unit time. The request is transmitted via a network to the cloud computing platform, and a media streaming application having multiple services and microservices managed by the cloud computing platform ingests the request and processes the request using the microservices.

In example embodiments, the metrics selected for the auto-scaling system to determine whether or not to scale, or the weight ascribed to selected metrics' relevance, depend on the type of application, in order to minimize incorporation of irrelevant data or noise in determining whether to scale. In examples, greater weight is placed on the request-specific metrics (e.g., the type, size and frequency of the requests) in the determination of whether or not to scale computing resources.

In example embodiments, a monitoring time interval (e.g., how often microservice data is collected) during the monitoring phase 12 is selected in order to maximize collection of useful data while minimizing resources needed to perform the monitoring. For example, shorter time intervals can generate additional data but require more computing resources than longer time intervals.

In the analysis phase 14, the auto-scaling system processes data collected in the monitoring phase and uses the collected data to predict future computing demands on the system and to determine whether scaling actions are required based on that analysis.

In the planning phase 16, the auto-scaling system determines when to perform the determined auto-scaling of computing resources.

In the execution phase 18, if scaling has been planned, the auto-scaling system causes the computing resources 11 to be scaled.

As mentioned above, auto-scaling features of the present disclosure can be suitably used for asynchronous computationally exceptive software applications, such as an application that uses a publish-subscribe pattern. Publish/Subscribe (PS) is an architectural design paradigm often used to handle message delivery in distributed systems. A schematically illustrated high level PS type system architecture 20 is shown in FIG. 3.

Figure 3:
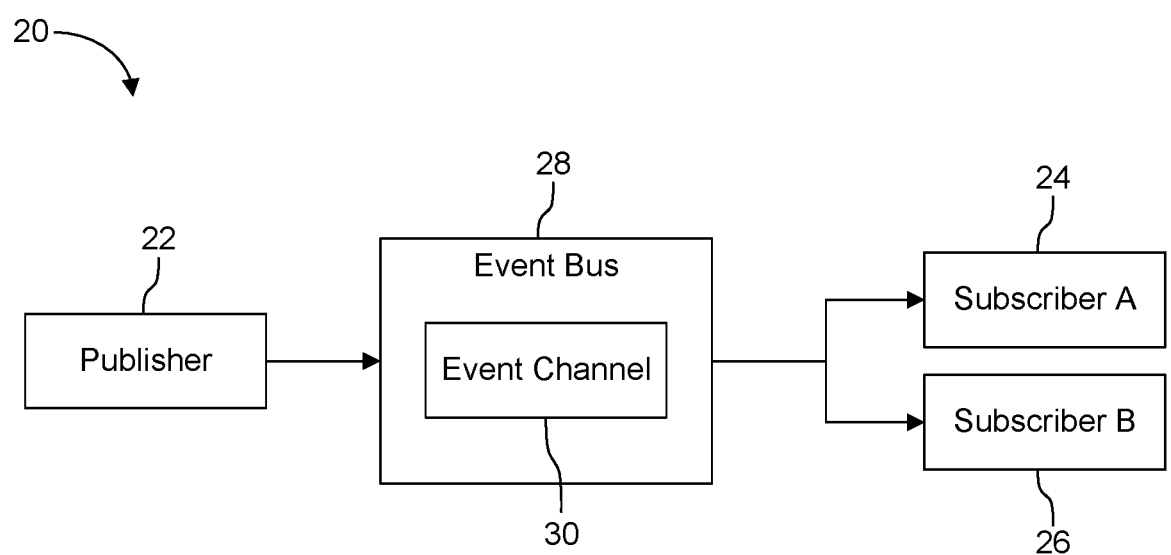
FIG. 3 schematically illustrates a high level Publisher/Subscriber type system architecture that can be suitable for performing resource auto-scaling according to the present disclosure.

Referring to FIG. 3, the PS system architecture 20 can support many-to-many communication, using asynchronous messages or events, and is designed to be highly reliable and scalable. In this pattern, the publisher 22 (e.g., the media content provider) and the subscribers 24, 26 (i.e., users of user devices 116, 118) rely on an event bus 28 (also referred to as a message broker) to deliver the messages. The events are published on an event channel 30 that defines a topic per event and users interested in a given topic can subscribe to the corresponding feed. The PS event bus 28 delivers each published event to all of the subscribers subscribed to that topic.

As used herein, the term smallest deployable computer processing unit (SDCPU) refers to the smallest deployable unit of computing that represents a processing power running on a cluster. In examples, a SDCPU is a group of one or more containers, tightly coupled with shared storage and network, that can be replicated. Containers are used in cloud computing. A container is an abstraction at the application layer that is run by a single operating system kernel. In a cloud computing environment, multiple containers can run on the same machine, sharing resources with other containers. To handle an increasing workload, new replicas of the SDCPU can be deployed. For a decreasing workload, SDCPUs can be shut down as needed.

Figure 4:
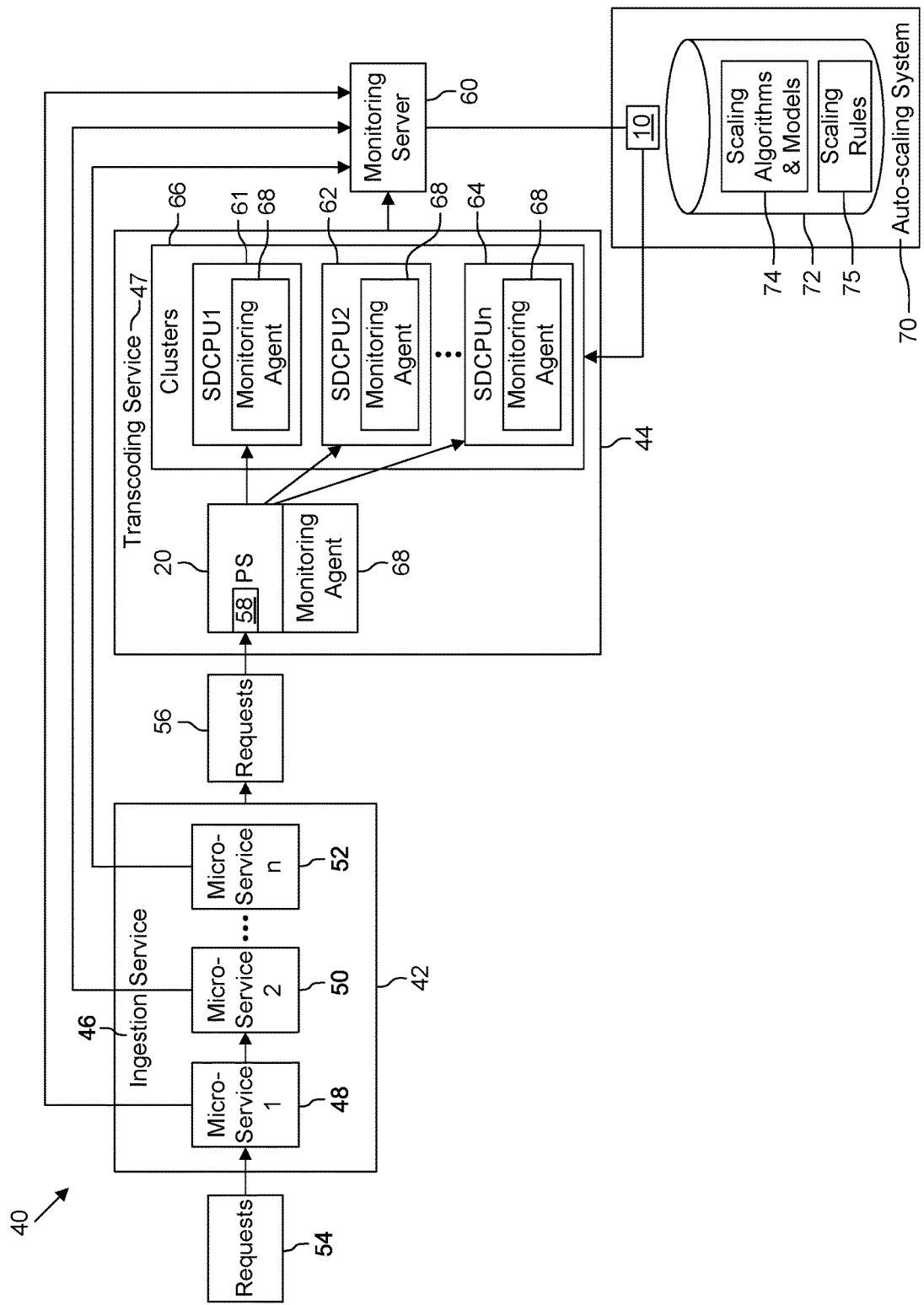
FIG. 4 schematically illustrates an example computing system, the computing system including an auto-scaling system according to the present disclosure.

FIG. 4 schematically illustrates an example computing system 40, the computing system 40 including an auto-scaling system according to the present disclosure. In example embodiments, the computing system 40 is part of a cloud computing platform operating a plurality of servers. The servers include processors that process and execute computer-readable instructions stored on computer readable storage. The servers and storage are interconnected via a network. The servers can be physically remote from one another, and/or in the same room or building. One or more of servers are configured to execute computer readable instructions that perform the auto-scaling functionalities disclosed herein.

The system 40 includes a first computer processing bloc 42 and a second computer processing bloc 44. The blocs 42 and 44 can run on a single server or across multiple servers. Each bloc 42, 44 runs a service for a computer application. In this example, the application is streaming of media content items, such as podcasts, movies, concerts, sporting events, television programs, lectures, speeches, live or pre-recorded events, etc. Other applications may be suitably auto-scaled as described above.

The bloc 42 runs a media content item streaming ingestion service. The ingestion service includes a plurality of microservices 48, 50, 52 that are performed in a sequence that defines an ingestion pipeline for the service 46. The ingestion pipeline receives requests 54 for publication of streaming of new or modified media content items. For example, the requests 54 can include requests from media content providers to publish new or modified media content items. In some implementations, requests 54 can also include requests from users via user electronic devices to stream media content items. The requests 54 are then processed by the microservices 48, 50, 52, each request corresponding to a sequence of microservice events.

The microservices 48, 50, 52 of the ingestion pipeline include data processing services that cache new requests 54. Once a request has already gone through the bloc 42 and sent to the bloc 44, that request is dropped from the bloc 42. The data processing in the ingestion pipeline can be seen as several steps that have to be completed before reaching the service(s) performed by the bloc 44.

The microservices 48, 50, 52 can include, for example, a request parsing microservice, a file download microservice, and other microservices associated with media streaming. Though described as individual microservices 48, 50, 52, the microservices need not be independent from one another. For example, a single microservice can perform multiple functions, such parsing and file downloading. As will be described in greater detail below, the microservices 48, 50, 52 are monitored by a monitoring server 60. The monitoring server 60 can be a separate server or the same server as one of the one or more servers handling the ingestion and transcoding services. The monitoring server 60 collects timestamped event data from the microservices. That event data is then analyzed and used to auto-scale computing resources for the transcoding service that is performed after the ingestion service. Such time-stamped event data can include a when a request 54 is parsed event, a when a file download begins event, and a when a file download finishes event. Each event is sent to the monitoring server 60 and can be used as an indicator of the incoming requests that will be fed to the transcoding service, e.g., incoming requests that have not been dropped prior to transcoding.

Requests 56 are at least a subset of the requests 54 that have completed the ingestion streaming service and are then fed to the bloc 44.

The bloc 44 runs a media content item transcoding service 47. The transcoding service 47 includes one or more microservices (not shown) that define a transcoding pipeline that transcodes a media content item requested to be published by, e.g., a media content provider. The requests 56 are handled by a broker 58. The broker 58 receives a request 56 (e.g., a request by a media content provider to publish a media content item), and publishes a PS message using a PS system 20 to create a new transcoding job for the SDCPUs 61, 62, 64 inside the cluster 66 of SDCPUs. In addition, the broker 58 sends a timestamped event, e.g., via a monitoring agent 68, to the monitoring server 60 indicating that a new request was received.

The PS message is received by one of the SDCPUs 61, 62, 64 that will transcode the incoming request 56. Once the message is received the corresponding SDCPU will acknowledge the message by notifying the PS event bus of the PS system 20 that the message has been delivered.

Each SDCPU 61, 62, 64 in the cluster 66 only works on a single request 56 at a given time. Thus, should the number of undelivered PS messages exceed the number of available SDCPUs there will be a queue of undelivered messages that the SDCPUs will pick up one by one. Each SDCPU sends two timestamped event messages to the monitoring server 60 via a corresponding monitoring agent 68, including a when a transcoding job has started event and a when a transcoding job has finished event. The duration of each job performed by one of the SDCPUs varies based on the type of the request (e.g., the format type of the file that is being transcoded) and the size of the file that is associated with the request.

The auto-scaling system 70 receives the time event data received from the microservices 48, 50 and 52 of the ingestion service 46, and from the monitoring agents 68 associated with the transcoding service 47. In some examples, these data are received by the auto-scaling system 70 via the monitoring server 60. In other examples, the monitoring server 60 is incorporated as a component of the auto-scaling system 70. The auto-scaling system 70 uses a multi-phase processing loop 10, as described above, to analyze the time event data received from the microservices 48, 50 and 52 of the ingestion service 46, and from the monitoring agents 68 associated with the transcoding service 47. Further details regarding the auto-scaling system 70 and how the auto-scaling system 70 uses the time event data metrics to predict future computing needs for the cluster 66 will be described below.

Predicting Cluster Computing Needs at a Future Time

The auto-scaling system 70 is configured to estimate the amount of computing resources that are needed at some time in the future in order to avoid over-provisioning of computing resources, which can lead to substandard resource utilization, as well as under-provisioning of computing resources, which can result in SLA violations.

The auto-scaling system 70 is configured to determine whether one or more SDCPUs should be added to the cluster 66 or removed from the cluster 66 at the current time or at some future time. The auto-scaling system 70 uses one or more scaling algorithms 74 and scaling rules 75 applied to outputs of the scaling algorithm(s) 74 stored in computer-readable storage 72 of the auto-scaling system 70, or which the auto-scaling system 70 can access.

The scaling algorithm(s) 74 and rules 75 determine how many SDCPUs are needed at future time t+1, with the present time being represented as time t, and past times being represented as time t−1, t−2, t−3, t−n, etc., with consistent predefined intervals between consecutive times, e.g., 30 second or 60 second intervals.

In example embodiments, scaling algorithm(s) 74 and rules 75 also balance the predicted workload with cost concerns to avoid over-provisioning of computer resources.

In example embodiments, the scaling algorithm(s) 74 and rules 75 optimize deployment of SDCPUs at a future time to meet QoS requirements or to exceed QoS requirements by up to a maximum pre-defined amount in order to reduce cost and conserve computing resources while still meeting QoS requirements.

In example embodiments, using the QoS requirements as a target or a basis for a target, the scaling rules take a predicted workload output from an algorithm 74 and apply a rule 75 to optimize deployment of SDCPUs at a future time t+1 based on the predicted workload, the desired throughput of the system (throughput), the current queue length of the system (queue length) and a rate at which the queue should be drained (drain time).

As used herein, throughput is the number of requests 56 handled by the transcoding service. As used herein, queue length is the number of requests 56 that have been sent to the transcoding service but not yet started.

In example embodiments, the throughput and the drain time are configurable parameters and can be based on, e.g., the QoS requirements.

In example embodiments, the scaling rules 75 use the following equation (1) to determine a number of SDCPUs to be deployed at a future time t+1.

$$\frac{PredictedWorkload}{Throughput} + \frac{QueueLength}{(DrainTime * Throughput)} = SCDPUs \quad (1)$$

In this equation (1), the predicted workload is a proactive metric, the throughput and the drain time are user definable parameters, and the queue length is a reactive measurement that reflects the current state of the system. Thus, equation (1) represents a hybrid auto-scaling method, since it uses both predictive and reactive metrics to scale computing resources.

Figure 5:
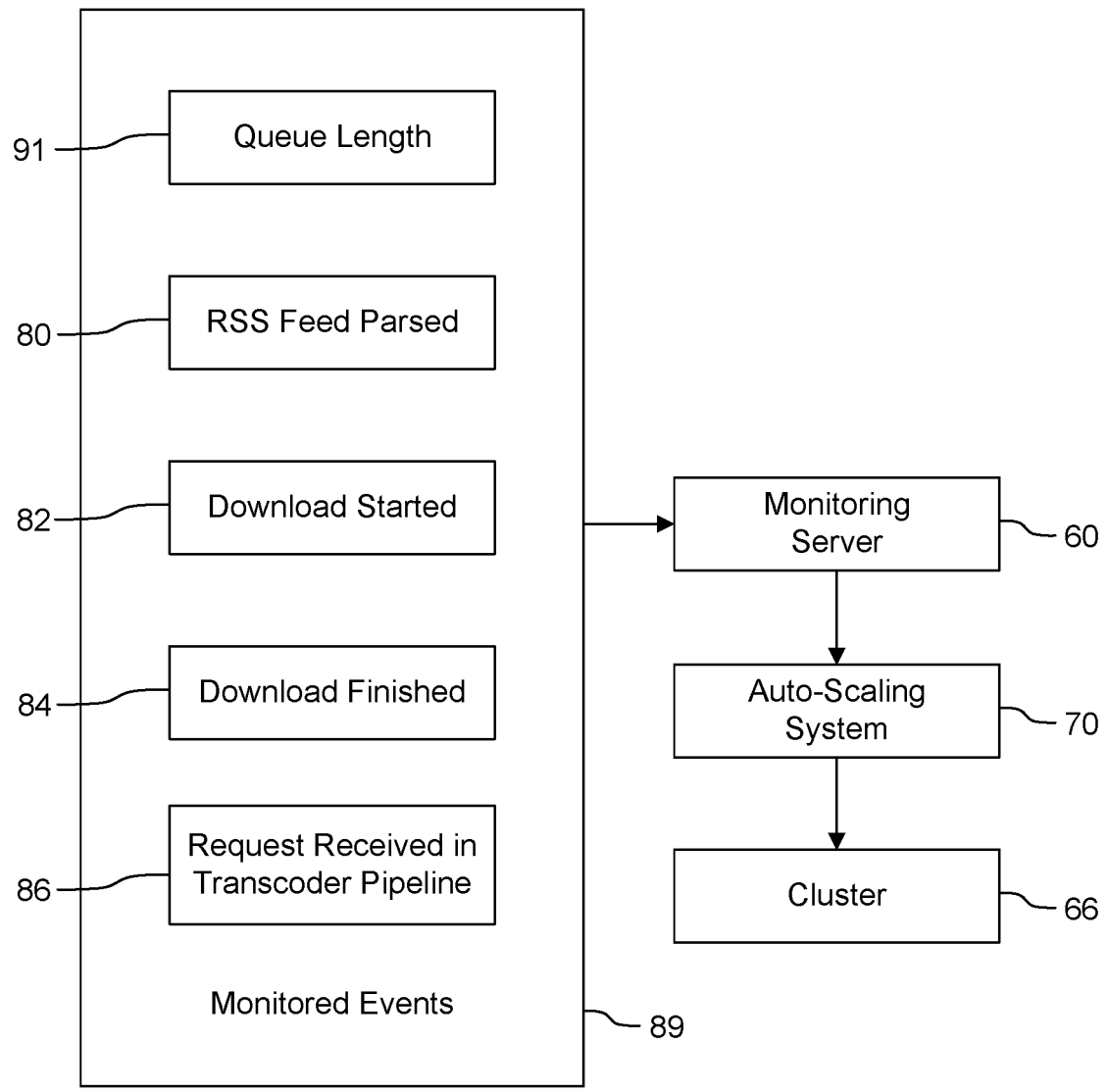
FIG. 5 schematically illustrates interactions between components of the computing system of FIG. 4.

Referring to FIG. 5, in example embodiments the scaling algorithm(s) 74 use four time-stamped event types to predict a predicted workload Y at time t+1. In other examples, fewer or more event types can be used to predict workload.

The four time-stamped event types include three ingestion service events and one transcoding service event. The three ingestion service events relate to the requests 54 and include a Really Simple Syndication (RSS) feed parsed event 80 for a request 54. RSS feeds are often used for obtaining streaming media content, such as a podcast. For example, a user interested in streaming a particular podcast can add the RSS feed to their podcast platform application on their user device 116, 118, and the platform application can then list available episodes and download or stream them for listening or viewing. Additional ingestion service events include a downloading started event 82 for a request 54, and a downloading finished event 84 for a request 54. The one transcoding event type relates to the requests 56 and includes receipt of a request in the transcoder pipeline event 86. The receipt of a request 56 event occurs before the request 56 is sent to a SDCPU.

In example embodiments, additional metrics are used by the scaling algorithm(s) 74. Such metrics can include, for example, the length of the media content item being requested for publication, and the type of formatting of the media content item, e.g., the audio format type. These metrics can be used, e.g., to adjust the weighted impact of the events on the predicted workload Y.

The monitoring server 60 monitors the number of each of these events 89 at a plurality of times t−n, t−2, t−1, t, with consecutive times separated by a preset consistent interval, e.g., 30 seconds, 60 seconds, or another interval, and where n is a positive integer greater than 2. Thus, at each time, the number of each event type reflects the number of times that event type occurred in the interval immediately preceding the time in question. The auto-scaling system 70 receives the monitored data, including the number of each event type, the type of each event, and the intervals or times associated with the intervals in which those events occurred. In some examples, other metrics, such as those described above, can also be received by the auto-scaling system 70.

In example embodiments, for a given set of times or intervals, all of the event types are monitored. In other example embodiments, certain event types are monitored at certain times or intervals and other event types are monitored at other times or intervals. In further example embodiments, a subset of all event types are monitored at certain times or intervals, and all event types are monitored at other times or intervals.

Using the algorithm(s) 74, the auto-scaling system 70 uses the event data to generate a workload prediction Y to which one or more rules (e.g., the equation (1)) are applied, to generate a scaling request that is received by the cluster 66.

The algorithm(s) 74 can include one or more machine learning models and the received event data is contextualized according to the model(s). The contextualized data is then associated with one or more auto-scaling rules 75 (FIG. 4) that define an auto-scaling action to be sent to the cluster 66.

Figure 6:
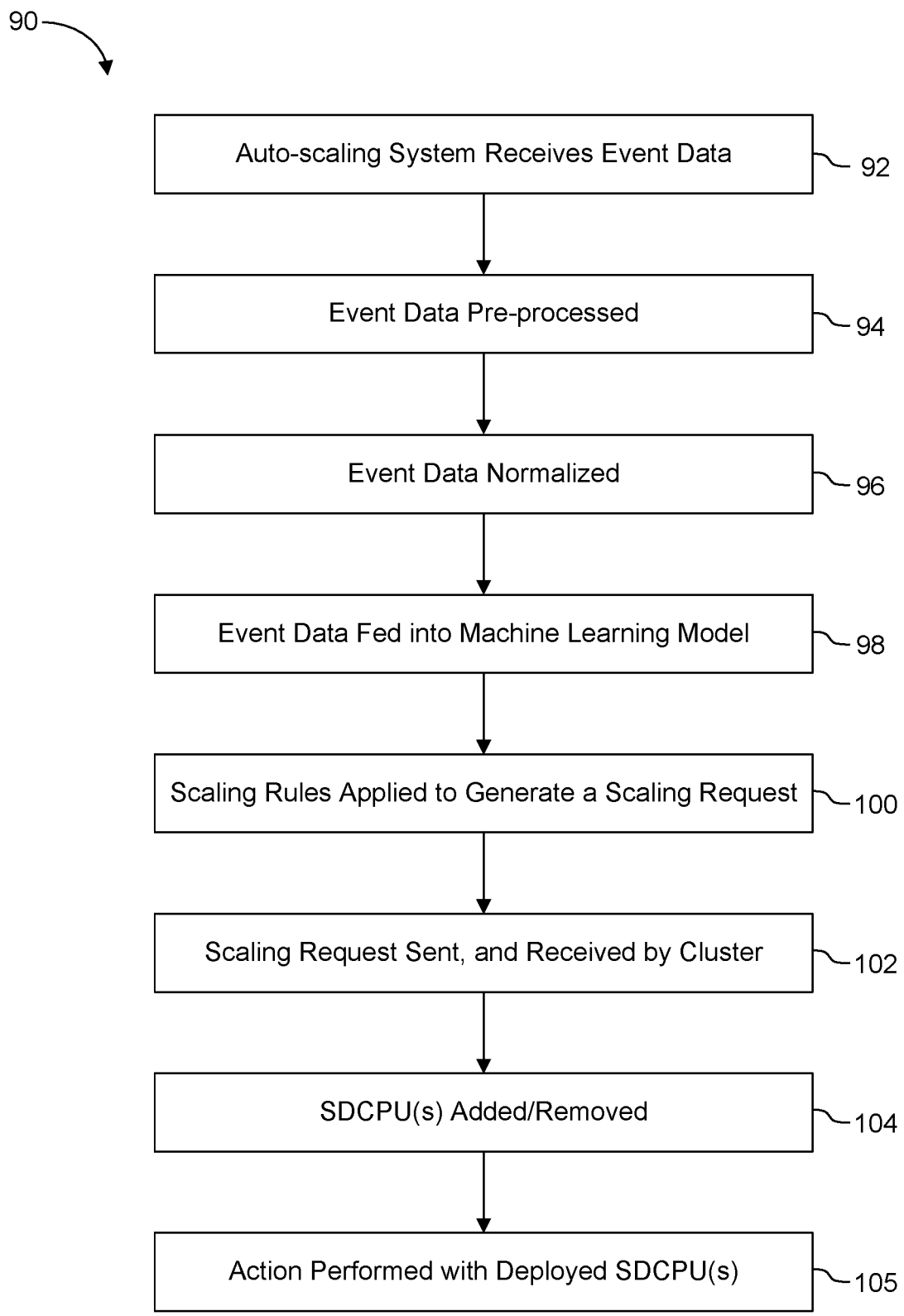
FIG. 6 illustrates an example auto-scaling process flow in accordance with the present disclosure.

Referring to FIG. 6, an example method 90 of contextualizing monitored event data to a machine learning model is described.

At a step 92 of the method 90, the event data is received by the auto-scaling system.

At a step 94 of the method 90, the received data are pre-processed by grouping together events into predefined time intervals based on the specific timestamps of the events, such that a given event is associated with its corresponding time interval only.

At a step 96 of the method 90, the pre-processed event data is normalized to minimize variance within the data. Example suitable normalization methods include, e.g., rescaling, mean normalization, and standardizing.

At a step 98 of the method 90, the pre-processed and normalized event data is plugged into a machine-learning model. In examples, the model is based on a linear regression algorithm. For example, the model can be based on the equation (2):

$$Y=\beta_0+\beta_1 x_1+ \ldots +\beta_n x_n \qquad (2),$$

where Y represents the number of requests at the next timestamp. That is, Y is a workload prediction, i.e., a prediction of how many requests 56 (FIG. 4) the system will receive at time t+1. The data set $x_1 \ldots x_n$ represents the events at the pre-t+1 monitored times or time intervals. The coefficients $\beta_0 \ldots \beta_n$ can be machine learned. These coefficients are weights that represent the relative significance of each monitored event to the overall workload prediction Y. For each future time t+1, t+2 . . . t+m, a workload prediction Y is calculated. In addition, the monitoring server 60 receives data reflecting the current queue length at time t.

At a step 100, the scaling rules 75 (FIG. 4) are then applied to each Y prediction to generate a scaling request that is received and implemented by the cluster 66 (FIG. 4), e.g., by plugging in the current queue length and the value Y as the predicted workflow into the equation (1).

In some examples, and for at least certain types of monitored events, the events occurring closer to the future time in question are more significant and weighted more heavily than occurrences of the same time event occurring at earlier times. For example, a given request 54 (FIG. 4), having a monitored parsing event at time t−5 is more likely to be dropped before being received by the transcoding service than a download finished event at time t−5, and the former event is therefore weighted, by its coefficient, less than the latter event.

At a step 102, the generated scaling request is sent from the auto-scaling system 70 (FIG. 4) and received by the cluster 66 (FIG. 4).

At a step 104, one or more SDCPUs are added to or removed from the cluster 66 so that the appropriate number of SDCPUs corresponding to the generated scaling request are available at the future time t+1.

Optionally, at a step 105, at the time t+1 the deployed SDCPUs perform the requested actions, e.g., transcode one or more media content items.

In example embodiments, the SDCPU scaling request generated at the step 100 is automatically employed by the transcoding service at the future time. In other example embodiments, the SDCPU scaling request generated at the step 100 is used as a baseline requirement only. For example, the system may already be planning to run more than enough SDCPUs to handle the predicted requests at the time t+1 despite the potential for wasted resources. In such situations, the SDCPU scaling request can be ignored. Thus, in some examples, the scaling request generated at the step 100 is only executed at the step 104 if there would otherwise be insufficient computing resources available in the cluster at the time t+1 to meet QoS requirements.

It should be appreciated that computer processing resources is just one example of computing resources that can be scaled using principles of the present disclosure. Other computing resources, e.g., computing memory and other computing resources associated with cloud computing platforms, can also be scaled using the principles of this disclosure.

Example System Implementation

Figure 7:
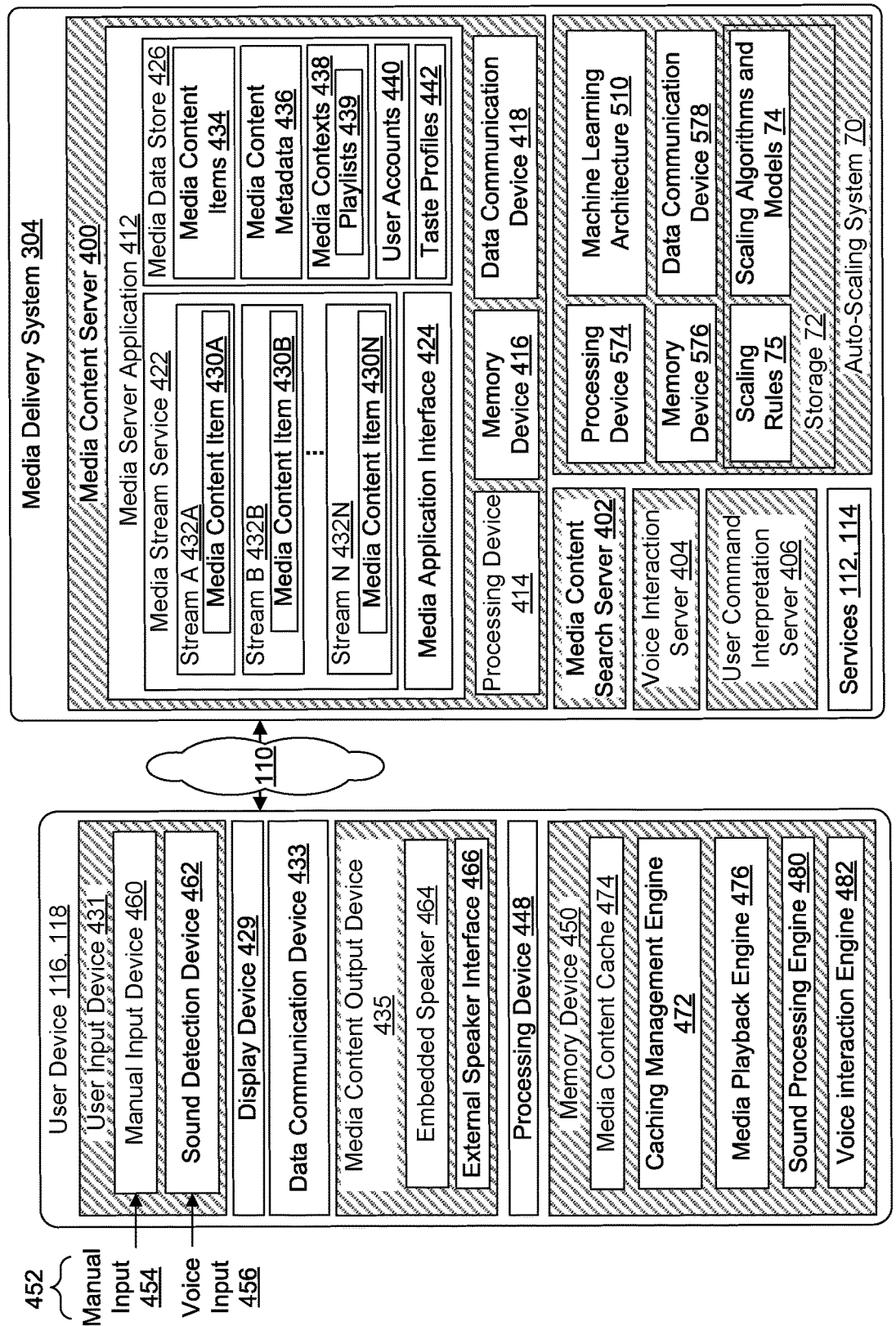
FIG. 7 is a representative view of a system in which some embodiments of the invention may be implemented.

FIG. 7 is a representative view of a system (e.g., the system 2 of FIG. 1) in which some embodiments of the invention may be implemented. The media delivery system 304 operates to provide media content to one or more media playback devices, such as the user device 116, 118, via the network 110. Thus, the media delivery system 304 can include, in some embodiments, hardware, software, and firmware configured to perform the services 112, 114.

In this document, the media content that is currently playing, queued to be played, or has been previously played can be represented as a first media content item. In addition, the media content that will be played after the first media content item is referred to as a second media content item. Further, the media content that will be played after the second media content item is referred to as a third media content item. The first media content item, the second media content item, and the third media content item can be of various types. In some embodiments, the first media content item and/or the second media content item can be media content items 430A, 430B, . . . 430N (collectively and/or individually sometimes referred to simply as media content item 430) or media content item 434. Alternatively, the first media content item, the second media content item and/or the third media content item can be playlists 439. In still other embodiments, the first media content item, the second media content item and/or the third media content item can be of other types of media contexts 438.

In some embodiments, a query=to stream a media content item) can be provided via a manual input 454. In other embodiments a query can be provided via a voice input 456. A voice input 456, can be a voice query received through a sound detection device (e.g., a microphone). The voice query can be processed into a text query suitable for media content search. In other embodiments, the query can be a text that is typed using the user device 116, 118 or another computing device.

Still referring to FIG. 7, in this example, the user device 116, 118 includes a user input device 431, a display device 429, a data communication device 433, a media content output device 435, a processing device 448, and a memory device 450.

The user device 116, 118 operates to play media content. For example, the user device 116, 118 is configured to play media content that is provided (e.g., streamed or transmitted) by a system external to the user device 116, 118, such as the media delivery system 304, another system, or a peer device. In other examples, the user device 116, 118 operates to play media content stored locally on the user device 116, 118. In yet other examples, the user device 116, 118 operates to play media content that is stored locally as well as media content provided by other systems.

In some embodiments, the user device 116, 118 is a handheld or portable entertainment device, smart speaker, smartphone, tablet, watch, wearable device, or any other type of computing device capable of playing media content. In other embodiments, the user device 116, 118 is a laptop computer, desktop computer, television, gaming console, set-top box, network appliance, blue-ray or DVD player, media player, stereo, or radio, some examples of which are depicted in FIG. 7.

The user input device 431 operates to receive a user input 452 from a user for controlling the user device 116, 118. As illustrated, the user input 452 can include a manual input 454 and a voice input 456. In some embodiments, the user input device 431 includes a manual input device 460. In some embodiments the user input device 431 includes a sound detection device 462.

The manual input device 460 operates to receive the manual input 454 for controlling playback of media content via the user device 116, 118. In some embodiments, the manual input device 460 includes one or more buttons, keys, touch levers, switches, and/or other mechanical input devices for receiving the manual input 454. For example, the manual input device 460 includes a text entry interface, such as a mechanical keyboard, a virtual keyboard, or a handwriting input device, which is configured to receive a text input, such as a text version of a user query. In addition, in some embodiments, the manual input 454 is received for managing various pieces of information transmitted via the user device 116, 118 and/or controlling other functions or aspects associated with the user device 116, 118.

The sound detection device 462 operates to detect and record sounds from proximate the user device 116, 118. For example, the sound detection device 462 can detect sounds including the voice input 456. In some embodiments, the sound detection device 462 includes one or more acoustic sensors configured to detect sounds proximate the user device 116, 118. For example, acoustic sensors of the sound detection device 462 include one or more microphones. Various types of microphones can be used for the sound detection device 462 of the user device 116, 118.

In some embodiments, the voice input 456 is a voice of a user for controlling playback of media content via the user device 116, 118. For example, the voice input 456 includes a voice version of a user query received from the sound detection device 462 of the user device 116, 118. In addition, the voice input 456 is a voice of a user for managing various data transmitted via the user device 116, 118 and/or controlling other functions or aspects associated with the user device 116, 118.

In some embodiments, the sounds detected by the sound detection device 462 can be processed by the sound processing engine 480 of the user device 116, 118 as described below.

Referring still to FIG. 7, the display device 429 operates to display information to a user. Examples of such information include media content playback information, notifications, and other information. In some embodiments, the display device 429 is configured as a touch sensitive display and includes the manual input device 460 of the user input device 431 for receiving the manual input 454 from a selector (e.g., a finger, stylus etc.) controlled by the user. In some embodiments, therefore, the display device 429 operates as both a display device and a user input device. The touch sensitive display device 429 operates to detect inputs based on one or both of touches and near-touches. In some embodiments, the display device 429 displays a graphical user interface for interacting with the user device 116, 118. Other embodiments of the display device 429 do not include a touch sensitive display screen. Some embodiments include a display device and one or more separate user interface devices. Further, some embodiments do not include a display device.

The data communication device 433 operates to enable the user device 116, 118 to communicate with one or more computing devices over one or more networks, such as the network 110. For example, the data communication device 433 is configured to communicate with the media delivery system 304 and receive media content from the media delivery system 304 at least partially via the network 110. The data communication device 433 can be a network interface of various types which connects the user device 116, 118 to the network 110.

The network 110 typically includes a set of computing devices and communication links between the computing devices. The computing devices in the network 110 use the links to enable communication among the computing devices in the network. The network 110 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 110 includes various types of communication links. For example, the network 110 can include wired and/or wireless links, including cellular, Bluetooth®, Wi-Fi®, ultra-wideband (UWB), 802.11, ZigBee, near field communication (NFC), an ultrasonic data transmission, and other types of wireless links. Furthermore, in various embodiments, the network 110 is implemented at various scales. For example, the network 110 can be implemented as one or more vehicle area networks, local area networks (LANs), metropolitan area networks, subnets, wide area networks (WAN) (such as the Internet), or can be implemented at another scale. Further, in some embodiments, the network 110 includes multiple networks, which may be of the same type or of multiple different types.

Examples of the data communication device 433 include wired network interfaces and wireless network interfaces. Wireless network interfaces include infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 435 operates to output media content. In some embodiments, the media content output device 435 generates the media output for the user. In some embodiments, the media content output device 435 includes one or more embedded speakers 464 which are incorporated in the user device 116, 118.

Alternatively or in addition, some embodiments of the user device 116, 118 include an external speaker interface 466 as an alternative output of media content. The external speaker interface 466 is configured to connect the user device 116, 118 to another system having one or more speakers, such as headphones, a portal speaker, and a vehicle entertainment system, so that the media output is generated via the speakers of the other system external to the user device 116, 118. Examples of the external speaker interface 466 include an audio output jack, a USB port, a Bluetooth transmitter, a display panel, and a video output jack. Other embodiments are possible as well. For example, the external speaker interface 466 is configured to transmit a signal that can be used to reproduce an audio signal by a connected or paired device such as headphones or a speaker.

The processing device 448, in some embodiments, comprises one or more central processing units (CPU). In other embodiments, the processing device 448 additionally or alternatively includes one or more digital signal processors, field-programmable gate arrays, or other electronic circuits.

The memory device 450 typically includes at least some form of computer-readable media. The memory device 450 can include at least one data storage device. Computer readable media includes any available media that can be accessed by the user device 116, 118. By way of example, computer-readable media is non-transitory and includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the user device 116, 118. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 450 operates to store data and instructions. In some embodiments, the memory device 450 stores instructions for a media content cache 472, a caching management engine 474, a media playback engine 476, a sound processing engine 480, and a voice interaction engine 482.

Some embodiments of the memory device 450 include the media content cache 472. The media content cache 472 stores media content items, such as media content items that have been received from the media delivery system 304. The media content items stored in the media content cache 472 may be stored in an encrypted or unencrypted format. In some embodiments, the media content cache 472 also stores metadata about media content items such as title, artist name, album name, length, genre, mood, era, etc. The media content cache 472 can further store playback information about the media content items and/or other information associated with the media content items.

The caching management engine 474 is configured to receive and cache media content in the media content cache 472 and manage the media content stored in the media content cache 472. In some embodiments, when media content is streamed from the media delivery system 304, the caching management engine 474 operates to cache at least a portion of the media content into the media content cache 472. In other embodiments, the caching management engine 474 operates to cache at least a portion of media content into the media content cache 472 while online so that the cached media content is retrieved for playback while the user device 116, 118 is offline.

The media playback engine 476 operates to play media content to a user. As described herein, the media playback engine 476 is configured to communicate with the media delivery system 304 to receive one or more media content items (e.g., through a media stream 432). In other embodiments, the media playback engine 476 is configured to play media content that is locally stored in the user device 116, 118.

In some embodiments, the media playback engine 476 operates to retrieve one or more media content items that are either locally stored in the user device 116, 118 or remotely stored in the media delivery system 304. In some embodiments, the media playback engine 476 is configured to send a query to the media delivery system 304 for media content items and receive information about such media content items for playback.

The sound processing engine 480 is configured to receive sound signals obtained from the sound detection device 462 and process the sound signals to identify different sources of the sounds received via the sound detection device 462. In some embodiments, the sound processing engine 480 operates to filter the voice input 456 (e.g., a voice typeuser query) from noises included in the detected sounds. Various noise cancellation technologies, such as active noise control or cancelling technologies or passive noise control or cancelling technologies, can be used to filter the voice input from ambient noise. In examples, the sound processing engine 480 filters out omni-directional noise and preserves directional noise (e.g., an audio input difference between two microphones) in audio input. In examples, the sound processing engine 480 removes frequencies above or below human speaking voice frequencies. In examples, the sound processing engine 480 subtracts audio output of the device from the audio input to filter out the audio content being provided by the device (e.g., to reduce the need of the user to shout over playing music). In examples, the sound processing engine 480 performs echo cancellation. By using one or more of these techniques, the sound processing engine 480 provides sound processing customized for use in a vehicle environment.

In other embodiments, the sound processing engine 480 operates to process the received sound signals to identify the sources of particular sounds of the sound signals, such as people's conversation in a vehicle or other location, the vehicle engine sound, or other ambient sounds associated with the vehicle or other location.

In some embodiments, the sound processing engine 480 at least partially operates to analyze a recording of sounds captured using the sound detection device 462, using speech recognition technology to identify terms spoken by the user. In addition or alternatively, other computing devices, such as the media delivery system 304 (e.g., a voice interaction server 404 thereof) can cooperate with the user device 116, 118 for such analysis. The terms may be recognized as commands from the user that alter the playback of media content and/or other functions or aspects of the user device 116, 118. In some embodiments, the terms and/or the recordings may also be analyzed using natural language processing and/or intent recognition technology to determine appropriate actions to take based on the spoken terms. Additionally or alternatively, the sound processing engine 480 may determine various sound properties about the sounds proximate the user device 116, 118 such as volume, dominant frequency or frequencies, etc. These sound properties may be used to make inferences about the environment proximate to the user device 116, 118.

The voice interaction engine 482 operates to cooperate with the media delivery system 304 (e.g., a voice interaction server 404 thereof) to identify a command (e.g., a user intent) that is conveyed by the voice input 456. In some embodiments, the voice interaction engine 482 transmits the voice input 456 (e.g., of a user) that is detected by the sound processing engine 480 to the media delivery system 304 so that the media delivery system 304 operates to determine a command intended by the voice input 456. In other embodiments, at least some of the determination process of the command can be performed locally by the voice interaction engine 482.

In addition, some embodiments of the voice interaction engine 482 can operate to cooperate with the media delivery system 304 (e.g., the voice interaction server 404 thereof) to provide a voice assistant that performs various voice-based interactions with the user, such as voice feedbacks, voice notifications, voice recommendations, and other voice-related interactions and services.

Referring still to FIG. 7, the media delivery system 304 includes a media content server 400, a media content search server 402, a voice interaction server 404, a user command interpretation server 406, the auto scaling system 70, and the services 112 and 114 (FIG. 1).

The media delivery system 304 comprises one or more computing devices and provides media content to the user device 116, 118 and, in some embodiments, other media playback devices as well. In addition, the media delivery system 304 interacts with the user device 116, 118 to provide the user device 116, 118 with various functionalities.

In at least some embodiments, the media content server 400, the media content search server 402, the voice interaction server 404, the user command interpretation server 406, and auto-scaling system 70 are provided by separate computing devices. In other embodiments, the media content server 400, the media content search server 402, the voice interaction server 404, the user command interpretation server 406, and the auto-scaling system 70 are provided by the same computing device(s). Further, in some embodiments, at least one of the media content server 400, the media content search server 402, the voice interaction server 404, the user command interpretation server 406, and auto-scaling system 70 are provided by multiple computing devices. For example, the media content server 400, the media content search server 402, the voice interaction server 404, the user command interpretation server 406, and the auto-scaling system 70 may be provided by multiple redundant servers located in multiple geographic locations.

Although FIG. 7, for example shows a single media content server 400, a single media content search server 402, a single voice interaction server 404, a single user command interpretation server 406, and the auto-scaling system 70, some embodiments include multiple media content servers, media content search servers, voice interaction servers, user command interpretation servers, and auto-scaling systems. In these embodiments, each of the multiple media content servers, media content search servers, voice interaction servers, user command interpretation servers, and auto-scaling system servers may be identical or similar to the media content server 400, the media content search server 402, the voice interaction server 404, the user command interpretation server 406, and the auto-scaling system 70 respectively, as described herein, and may provide similar functionality with, for example, greater capacity and redundancy and/or services from multiple geographic locations. Alternatively, in these embodiments, some of the multiple media content servers, the media content search servers, the voice interaction servers, the user command interpretation servers and/or term masking system may perform specialized functions to provide specialized services. Various combinations thereof are possible as well.

The media content server 400 transmits stream media to media playback devices such as the user device 116, 118. In some embodiments, the media content server 400 includes a media server application 412, a processing device 414, a memory device 416, and a data communication device 418. The processing device 414 and the memory device 416 may be similar to the processing device 448 and the memory device 450, respectively, which have each been previously described. Therefore, the description of the processing device 414 and the memory device 416 are omitted for brevity purposes.

The data communication device 418 operates to communicate with other computing devices over one or more networks, such as the network 110. Examples of the data communication device include one or more wired network interfaces and wireless network interfaces. Examples of such wireless network interfaces of the data communication device 418 include wireless wide area network (WWAN) interfaces (including cellular networks) and wireless local area network (WLANs) interfaces. In other examples, other types of wireless interfaces can be used for the data communication device 418.

In some embodiments, the media server application 412 is configured to stream media content, such as music or other audio (e.g., podcasts), video, or other suitable forms of media content. The media server application 412 includes a media stream service 422, a media application interface 424, and a media data store 426. The media stream service 422 operates to buffer media content, such as media content items 430A, 430B, and 430N (collectively 430), for streaming to one or more media streams 432A, 432B, and 432N (collectively 432).

The media application interface 424 can receive queries or other communication from media playback devices or other systems, such as the user device 116, 118, to retrieve media content items from the media content server 400. For example, in FIG. 7, the media application interface 424 receives communication from the user device 116, 118 to receive media content from the media content server 400.

In some embodiments, the media data store 426 stores media content items 434, media content metadata 436, media contexts 438, user accounts 440, and taste profiles 442. The media data store 426 may comprise one or more databases and file systems. Other embodiments are possible as well.

As described herein, the media content items 434 (including the media content items 430) may be audio, video, or any other type of media content, which may be stored in any format for storing media content.

The media content metadata 436 provides various information (also referred to herein as attribute(s)) associated with the media content items 434. In addition or alternatively, the media content metadata 436 provides various information associated with the media contexts 438. In some embodiments, the media content metadata 436 includes one or more of title, artist name, album name, length, genre, mood, era, etc.

In some embodiments, the media content metadata 436 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chat rooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding term would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 436, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

As described above, the media contexts 438 can include playlists 439. The playlists 439 are used to identify one or more of the media content items 434. In some embodiments, the playlists 439 identify a group of the media content items 434 in a particular order. In other embodiments, the playlists 439 merely identify a group of the media content items 434 without specifying a particular order. Some, but not necessarily all, of the media content items 434 included in a particular one of the playlists 439 are associated with a common characteristic such as a common genre, mood, or era.

In some embodiments, a user can listen to media content items in a playlist 439 by selecting the playlist 439 via a media playback device, such as the user device 116, 118. The media playback device then operates to communicate with the media delivery system 304 so that the media delivery system 304 retrieves the media content items identified by the playlist 439 and transmits data for the media content items to the media playback device for playback.

In some embodiments, the playlist 439 includes one or more playlist descriptions. The playlist descriptions include information associated with the playlist 439. The playlist descriptions can include a playlist title. In some embodiments, the playlist title can be provided by a user using the user device 116, 118. In other embodiments, the playlist title can be provided by a media content provider (or a media-streaming service provider). In yet other embodiments, the playlist title can be automatically generated.

Other examples of playlist descriptions include a descriptive text. The descriptive text can be provided by the user and/or the media content provider, which is to represent the corresponding playlist 439. In other embodiments, the descriptive text of the playlist description can be obtained from one or more other sources. Such other sources can include expert opinion (e.g., music reviews or classification of music into genres), user opinion (e.g., reviews through websites, chat rooms, blogs, surveys, and the like), statistics (e.g., sales data), shared collections, lists of favorite playlists, and any text information that may be used to describe, rank, or interpret the playlist or music associated with the playlist. In some embodiments, the playlist descriptions can also be generated by a community of listeners and automatically retrieved from Internet sites, chat rooms, blogs, and the like.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding term would be used to describe the associated track, album or artist. Each term of the description vector indicates the probability that a corresponding term would be used to describe the associated track, album or artist.

In some embodiments, the playlist 439 includes a list of media content item identifications (IDs). The list of media content item identifications includes one or more media content item identifications that refer to respective media content items 434. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 436, which can further include other attributes of the media content item, such as album name, length, genre, mood, era, etc. as described herein.

At least some of the playlists 439 may include user-created playlists. For example, a user of a media streaming service provided using the media delivery system 304 can create a playlist 439 and edit the playlist 439 by adding, removing, and rearranging media content items in the playlist 439. A playlist 439 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 304 operates to generate a list of media content items recommended for the particular user or the particular group of users. In some embodiments, such recommended media content items can be selected based at least on the taste profiles 442 as described herein. Other information or factors can be used to determine the recommended media content items.

In addition or alternatively, at least some of the playlists 439 are created by a media streaming service provider. For example, such provider-created playlists can be automatically created by the media delivery system 304. In some embodiments, a provider-created playlist can be customized to a particular user or a particular group of users. By way of example, a playlist for a particular user can be automatically created by the media delivery system 304 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 440 are used to identify users of a media streaming service provided by the media delivery system 304. In some embodiments, a user account 440 allows a user to authenticate to the media delivery system 304 and enable the user to access resources (e.g., media content items, playlists, etc.) provided by the media delivery system 304. In some embodiments, the user can use different devices to log into the user account and access data associated with the user account in the media delivery system 304. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 442 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 442 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 442 can include other information. For example, the taste profiles 442 can include libraries and/or playlists of media content items associated with the user. The taste profiles 442 can also include information about the user's relationships with other users (e.g., associations between users that are stored by the media delivery system 304 or on a separate social media site).

The taste profiles 442 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 442 can represent a single user or multiple users. Conversely, a single user or entity can have multiple taste profiles 442. For example, one taste profile can be generated in connection with a user's media content play activity, whereas another separate taste profile can be generated for the same user based on the user's selection of media content items and/or artists for a playlist.

Referring still to FIG. 7, the media content search server 402 operates to perform a media content search in response to a media content search query, such as a user query to stream a podcast. In some embodiments, the media content search server 402 includes a media content search application, a processing device, a memory device, and a data communication device (not shown). The processing device, the memory device, and the data communication device for the media content search server 402 may be similar to the processing device 414, the memory device 416, and the data communication device 418, respectively, which have each been previously described.

In some embodiments, the media delivery system 304 provides auto-scaling of computing resources as described herein.

Referring still to FIG. 7, the voice interaction server 404 operates to provide various voice-related functionalities to the user device 116, 118. In some embodiments, the voice interaction server 404 includes a voice recognition application, a speech synthesis application, a processing device, a memory device, and a data communication device (not shown). The processing device, the memory device, and the data communication device of the voice interaction server 404 may be similar to the processing device 414, the memory device 416, and the data communication device 418, respectively, which have each been previously described.

In some embodiments, the voice recognition application and the speech synthesis application, either individually or in combination, operate to interact with the user device 116, 118 and enable the user device 116, 118 to perform various voice-related functions, such as voice media content search, voice feedback, voice notifications, etc.

In some embodiments, the voice recognition application is configured to perform speech-to-text (STT) conversion, such as receiving a recording of voice command (e.g., an utterance) and converting the utterance to a text format.

In some embodiments, the speech synthesis application is configured to perform text-to-speech (TTS) conversion, so that a language text is converted into speech. Then, the voice interaction server 404 can transmit an audio data or file for the speech to the user device 116, 118 so that the user device 116, 118 generates a voice assistance to the user using the transmitted audio data or file.

Referring still to FIG. 7, the user command interpretation server 406 operates to analyze the user command (e.g., the utterance) to determine appropriate actions to take according to the user command. In some embodiments, the user command interpretation server 406 analyzes a text version of a user command (e.g., a text version of the utterance). In other embodiments, a recording of the user command can be used for such analysis without converting into a text format.

In some embodiments, the user command interpretation server 406 includes a natural language understanding (NLU) application, a processing device, a memory device, and a data communication device (not shown). The processing device, the memory device, and the data communication device of the user command interpretation service may be similar to the processing device 414, the memory device 416, and the data communication device 418, respectively, which have each been previously described.

In some embodiments, the NLU application operates to analyze the text format of the utterance to determine functions to perform based on the utterance. The NLU application can use a natural language understanding algorithm that involves modeling human reading comprehension, such as parsing and translating an input according to natural language principles.

Referring still to FIG. 7, the auto-scaling system 70 operates to perform hybrid proactive (or predictive) and reactive auto-scaling computing resources for media content items 430 being streamed. In some embodiments, the auto-scaling system includes computer-readable storage 72 storing scaling algorithms and models 74 and scaling rules 75, as described above in connection with FIG. 4. The auto-scaling system 70 can also include a machine learning architecture 510 having a machine learning processor communicatively coupled to a training set database, a processing device 574, a memory device 576, and a data communication device 578. The processing device 574, the memory device 576, and the data communication device 578 for the auto-scaling system 70 may be similar to the processing device 414, the memory device 416, and the data communication device 418, respectively, which have each been previously described.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-7 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method of scaling a number of computer processing units, comprising the steps of:
   receiving processing requests, each processing request requiring a first processing service and a subsequent second processing service that receives output from the first service, processes the output and completes the processing request;
   monitoring, for each request, at each of a plurality of times that precede a predefined time, a plurality of previous processing events in an event sequence of the first processing service that processes the request, each of the previous processing events having an associated action type that is different from an associated action type of at least one later action performed by the second processing service that further processes the output of the first processing service for at least one of the requests, to provide previous events data;
   selecting a number of computer processing units to perform the at least one later action of the second processing service at the predefined time, the selecting being based on the previous events data; and
   making available at the predefined time the selected number of computer processing units to perform the at least one later action of the second processing service to complete the at least one of the requests.

2. The method of claim 1, wherein the previous events data includes the associated action type of each previous event and a number of instances of each of the previous events occurring at each of the times that precede the predefined time.

3. The method of claim 1, wherein each of the previous events is associated with one of a plurality of microservices of the first processing service.

4. The method of claim 3,
   wherein the action types include a parsing type and file downloading type; and
   wherein the previous events data include:
      when a request has been parsed;
      when a file download has begun; and
      when a file download has finished.

5. The method of claim 3, wherein each event sequence and the selecting are triggered by an availability of at least one new or modified media content item.

6. The method of claim 1,
   wherein the selecting the number of computer processing units is also based on one or more of:
      (i) a current length of a queue of the processing requests;
      (ii) a predetermined processing throughput of each of the computer processing units; and
      (iii) a predefined maximum length of time to complete processing of the queue.

7. The method of claim 6,
   wherein the first processing service includes a request ingestion service;
   wherein the second processing service includes a transcoding service that receives and processes output of the request ingestion service; and
   wherein each of the event sequences is triggered by a request to publish at least one media content item or by a request to stream at least one media content item received by the request ingestion service.

8. The method of claim 7,
   wherein the computer processing units are made available for the transcoding service; and
   wherein the at least one later action includes a transcoding of a media content item for streaming.

9. The method of claim 7, wherein the previous events data include:
   when a request has been parsed by the request ingestion service;
   when a file download has been begun by the request ingestion service;
   when a file download has been finished by the request ingestion service; and
   when the request has been received by the transcoder service.

10. The method of claim 1,
    wherein the previous events data is weighted based on:
       the associated time that precedes the predefined time; and
       the associated action type.

11. The method of claim 1, further comprising: performing, at the predefined time, the at least one later action with the made available computer processing units.

12. A system for scaling a number of computer processing units, comprising:
    one or more processors and one or more storage devices storing instructions that are operable, when executed by the one or more processors, to cause the one or more processors to:
       receive processing requests, each processing request requiring a first processing service and a subsequent second processing service that receives output from the first service, processes the output and completes the processing request;
       monitor, for each request, at each of a plurality of times that precede a predefined time, a plurality of previous processing events in an event sequence of the first processing service that processes the request, each of the previous processing events having an associated action type that is different from an associated action type of at least one later action performed by the second processing service that further processes the output of the first processing service for at least one of the requests, to provide previous events data;
       select a number of computer processing units to perform the at least one later action of the second processing service at the predefined time, to select being based on the previous events data; and
       make available at the predefined time the selected number of computer processing units to perform the at least one later action of the second processing service to complete the at least one of the requests.

13. The system of claim 12, wherein the previous events data includes the associated action type of each previous event and a number of instances of each of the previous events occurring at each of the times that precede the predefined time.

14. The system of claim 12, wherein each of the previous events is associated with one of a plurality of microservices of the first processing service.

15. The system of claim 14,
wherein the action types include a parse type and file download type; and
wherein the previous events data include:
when a request has been parsed;
when a file download has begun; and
when a file download has finished.

16. The system of claim 14, wherein each event sequence is triggered by an availability of at least one new or modified media content item.

17. The system of claim 14,
wherein the select the number of computer processing units is also based on one or more of:
(i) a current length of a queue of the processing requests;
(ii) a predetermined processing throughput of each of the computer processing units; and
(iii) a predefined maximum length of time to complete processing of the queue.

18. The system of claim 17,
wherein the instructions are operable, when executed by the one or more processors, to cause the one or more processors to provide a request ingestion service and a transcoding service;
wherein each event sequence is associated with the request ingestion service;
wherein the transcoding service receives the processing requests from the request ingestion service; and
wherein each of the event sequences is triggered by a request to publish at least one media content item or by a request to stream at least one media content item received by the request ingestion service.

19. The system of claim 18,
wherein the computer processing units are made available for the transcoding service; and
wherein the at least one later action includes a transcoding of a media content item for streaming.

20. The system of claim 18, wherein the previous events data include:
when a request has been parsed by the request ingestion service;
when a file download has been begun by the request ingestion service;
when a file download has been finished by the request ingestion service; and
when the request has been received by the transcoder service.

21. The system of claim 12,
wherein the previous events data is weighted based on:
the associated time that precedes the predefined time; and
the associated action type.

22. The system of claim 12, wherein the instructions, when executed by the one or more processors, further cause the one or more made available processing units to perform, at the predefined time, the at least one later action.

23. A non-transitory computer-readable medium having stored thereon one or more sequence of instructions for causing one or more processors to perform:
receiving processing requests, each processing request requiring a first processing service and a subsequent second processing service that receives output from the first service, processes the output and completes the processing request;
monitoring, for each request, at each of a plurality of times that precede a predefined time, a plurality of previous processing events in an event sequence of the first processing service that processes the request, each of the previous processing events having an associated action type that is different from an associated action type of at least one later action performed by the second processing service that further processes the output of the first processing service for at least one of the requests, to provide previous events data;
selecting a number of computer processing units to perform the at least one later action of the second processing service at the predefined time, the selecting being based on the previous events data; and
making available at the predefined time the selected number of computer processing units to perform the at least one later action of the second processing service to complete the at least one of the requests.

24. The non-transitory computer-readable medium of claim 23, wherein the previous events data includes the associated action type of each previous event and a number of instances of each of the previous events occurring at each of the times that precede the predefined time.

25. The non-transitory computer-readable medium of claim 23, wherein each of the previous events is associated with one of a plurality of microservices of the first processing service.

26. The non-transitory computer-readable medium of claim 25,
wherein the action types include a parsing type and file downloading type; and
wherein the previous events data include:
when a request has been parsed;
when a file download has begun; and
when a file download has finished.

27. The non-transitory computer-readable medium of claim 25, wherein each event sequence is triggered by an availability of at least one new or modified media content item.

28. The non-transitory computer-readable medium of claim 23,
wherein the selecting the number of computer processing units is also based on one or more of:
(i) a current length of a queue of the processing requests;
(ii) a predetermined processing throughput of each of the computer processing units; and
(iii) a predefined maximum length of time to complete processing of the queue.

29. The non-transitory computer-readable medium of claim 28,
wherein each event sequence is associated with a request ingestion service;
wherein a transcoding service receives the processing requests from the request ingestion service; and
wherein each of the event sequences is triggered by a request to publish at least one media content item or by a request to stream at least one media content item received by the request ingestion service.

30. The non-transitory computer-readable medium of claim 29,
- wherein the computer processing units are made available for the transcoding service; and
- wherein the at least one later action includes a transcoding of a media content item for streaming.

31. The non-transitory computer-readable medium of claim 29, wherein the previous events data include:
- when a request has been parsed by the request ingestion service;
- when a file download has been begun by the request ingestion service;
- when a file download has been finished by the request ingestion service; and
- when the request has been received by the transcoder service.

32. The non-transitory computer-readable medium of claim 23,
- wherein the previous events data is weighted based on:
  - the associated time that precedes the predefined time; and
  - the associated action type.

33. The non-transitory computer-readable medium of claim 23, wherein the one or more sequences of instructions cause the made available computer processing units to perform, at the predefined time, the at least one later action.

* * * * *